(12) United States Patent
Maekawa

(10) Patent No.: US 7,647,838 B2
(45) Date of Patent: Jan. 19, 2010

(54) SENSOR ELEMENT, SENSOR DEVICE, OBJECT MOVEMENT CONTROL DEVICE, OBJECT JUDGMENT DEVICE

(75) Inventor: Satoshi Maekawa, Tokyo (JP)

(73) Assignee: National Institute of Information and Communications Technology, Incorporated

( * ) Notice: Subject to any disclaimer, the term of this patent is extended or adjusted under 35 U.S.C. 154(b) by 152 days.

(21) Appl. No.: 11/886,862

(22) PCT Filed: Mar. 27, 2006

(86) PCT No.: PCT/JP2006/306101

§ 371 (c)(1),
(2), (4) Date: Sep. 21, 2007

(87) PCT Pub. No.: WO2006/106611

PCT Pub. Date: Oct. 12, 2006

(65) Prior Publication Data

US 2009/0031800 A1    Feb. 5, 2009

(30) Foreign Application Priority Data

Mar. 30, 2005    (JP) .......................... 2005-099827

(51) Int. Cl.
*G01L 1/00*    (2006.01)
(52) U.S. Cl. ........................................ 73/777
(58) Field of Classification Search ............. 73/777
See application file for complete search history.

(56) References Cited

U.S. PATENT DOCUMENTS

| | | | | |
|---|---|---|---|---|
| 4,786,887 A | * | 11/1988 | Bringmann et al. | 338/2 |
| 5,068,635 A | * | 11/1991 | Yajima | 338/42 |
| 5,367,429 A | * | 11/1994 | Tsuchitani et al. | 361/280 |
| 6,344,791 B1 | * | 2/2002 | Armstrong | 338/114 |
| 7,064,561 B2 | * | 6/2006 | Morimoto | 324/691 |
| 7,082,838 B2 | * | 8/2006 | Rowe et al. | 73/777 |
| 7,123,028 B2 | * | 10/2006 | Okada et al. | 324/681 |
| 7,255,011 B2 | * | 8/2007 | Morimoto | 73/781 |
| 2004/0055396 A1 | | 3/2004 | Morimoto | |

FOREIGN PATENT DOCUMENTS

| JP | 57-41083 A | 9/1982 |
|---|---|---|
| JP | 2000-162054 A | 6/2000 |

(Continued)

OTHER PUBLICATIONS

"T-2000 Adaptable array tactile sensor" SysCom, Inc.

(Continued)

*Primary Examiner*—Lisa M Caputo
*Assistant Examiner*—Octavia Davis
(74) *Attorney, Agent, or Firm*—Banner & Witcoff, Ltd.

(57) ABSTRACT

A sensor element capable of appropriately detecting an external force operating three-dimensionally is provided. The sensor element has an electrically conductive elastic member whose electrical property changes when compressed or expanded by an external force, and a plurality of electrode elements, which are capable of receiving power supply, for measuring electric properties from outside. The plurality of electrode elements are grouped into one or more sets, each having a predetermined number of electrode elements, for measuring electrical properties, and the electrode elements constituting a set are arranged three-dimensionally inside and on the surface of the conductive elastic member.

16 Claims, 10 Drawing Sheets

FOREIGN PATENT DOCUMENTS

| | | | |
|---|---|---|---|
| JP | 2004-117042 A | 4/2004 | |
| JP | 2004-330370 A | 11/2004 | |

OTHER PUBLICATIONS

"Inastomer", Inaba Rubber, Inc.
"Micro tactile sensor catheter research", Olympus Optical, Inc.
"TORAO research themes", Shinoda Labs, Department of Computer Science, Graduate School of Information Science and Engineering, Tokyo Institute of Technology.
"Distribute tactile sensor for control of grasping force", Maeno Laboratory, Department of Mechanical Engineering, Keio University.

* cited by examiner

SENSOR ELEMENT, SENSOR DEVICE, OBJECT MOVEMENT CONTROL DEVICE, OBJECT JUDGMENT DEVICE

CROSS REFERENCE TO RELATED APPLICATIONS

This application is a National Stage application of co-pending PCT application PCT/JP2006/306101 filed Mar. 27, 2006, which claims the benefit of Japanese application No. 2005-099827 filed Mar. 30, 2005. These applications are incorporated herein by reference in their entireties.

BACKGROUND OF THE INVENTION

The present invention relates to sensor elements for mounting on the fingertips of a robot hand or an artificial hand or the like in order to provide fine power adjustments that are required when grasp control operations or the like are performed, and to object movement control devices for controlling movement of objects and object judgment devices for discriminating objects, both of the aforementioned devices incorporating the sensor elements mounted on the fingertips of a robot hand or the like.

In recent years, research and development of multi-finger robot hands resembling human hands, and artificial hands has been undertaken with one of two objectives: the first, to provide robot hands or artificial hands capable of being used to perform operations on behalf of humans in places in places where it is difficult or potentially hazardous for humans to undertake the operations directly, such as operations performed in outer space and deep sea exploration, and operations in which an explosion may occur; the second, to provide prosthetic hands for people with physical disabilities in order to compensate for impeded functionality of their hands.

Further, in order to realize a level of operational dexterity more closely approaching that of the human hand, sensor elements for mounting on the fingertips of a robot hand, an artificial hand or the like, and which are capable of realizing the level of fine power adjustment required for grasp control have been developed and placed on the market.

Sensor devices such as those described above are known in which the control of grasping force is facilitated by detecting the amount of pressure applied to the sensor element. For example, Non-patent Reference No. 1 describes a capacitance pressure sensor device configured to facilitate control of the grasping force applied to the sensor element by measuring the capacitance between a pair of electrodes provided on a capacitance pressure sensor element. Non-patent Reference No. 2 describes an example of a pressure sensitive conductive elastomer sensor device configured to facilitate control of grasping force by measuring the amount of pressure applied to a pressure sensitive elastomer sensor element by detecting changes in the resistance between a pair of electrodes between which a pressure sensitive electrically conductive rubber has been inserted.

Further, sensor devices are also known in which the control of grasping force is facilitated by detecting contact between the sensor device and an object of grasping. For example, Non-patent Reference No. 3 describes a micro-pressure sensor device, which is provided with a vibrating tactile sensor disposed on the sensor device so as to be able to come into contact with an object of grasping, configured to facilitate control of grasping force through detecting contact with an object of grasping by measuring the viscoelastic property shown by changes in the magnitude and frequency of the vibrations when the vibrating tactile sensor has come into contact with the object of grasping.

Still further, Non-patent Reference No. 4 describes an example of a resonance tensor cell tactile sensor device that utilizes the ultra sound resonance phenomenon to detect changes in the dimensions of a spherical cavity provided within an elastic body so as to detect pressure applied to the elastic body so as to facilitate control of the grasping force. Further still, Non-patent Reference No. 5 describes an example of a distributed contact sensor device configured to facilitate control of the grasping force by use of a contacting surface slippage sensor element provided with a distributed strain gauge capable of detecting local slippage occurring between an object of grasping and the sensor element.

Non-patent Reference 1: "T-2000 Adaptable array tactile sensor", SysCom, Inc., accessed on Nov. 27, 2002 at http://www.syscom-inc.co.jp/pps_array.pdf Non-patent Reference 2: "Inastomer", Inaba Rubber, Inc., accessed on Nov. 27, 2002 at http://www.inaba-rubber.co.jp/katarogu/inast/inast.html Non-patent Reference 3: "Micro tactile sensor catheter research", Olympus Optical, Inc., accessed on Nov. 27, 2002 at http://www.oympus.co.jp/Special/OTF80/mskt.html Non-patent Reference 4: "TORAO research themes", Shinoda Labs, Department of Computer Science, Graduate School of Information Science and Engineering, Tokyo Institute of Technology, accessed on Nov. 27, 2002 at http://www.alab.t-u-tokyo.ac.jp/-shinolab/members/torao/ken-kyu/k enkyu1.html Non-patent Reference 5: "Distributed tactile sensor for control of grasping force", Maeno Laboratory, Department of Mechanical Engineering, Keio University, accessed on Nov. 27, 2002 at http://www.maeno.mech.keio.ac.jp/sensor2/sensor2.htm

SUMMARY OF THE INVENTION

However, a problem exists with the above-described sensors in that although it is possible to appropriately detect the amount of pressure applied to an object if the pressure is applied from a predetermined direction, it is difficult to identify the direction from which the pressure has been applied if the pressure is applied from a direction other than a predetermined direction.

That is to say, in the case of a capacitance pressure sensor device, if the pressure applied to the sensor device acts in a substantially vertical direction with respect to a pair of electrodes so that the distance therebetween is either reduced or increased, it is possible to appropriately detect the pressure; however, if the pressure is applied in a oblique direction, it is not possible to appropriately detect the pressure, causing a problem wherein it is difficult to control the grasping force.

Further, in the same manner, a problem exists with pressure sensitive conductive elastomer sensor devices wherein it is impossible to control grasping force because there are cases in which the applied pressure cannot be accurately detected depending on the direction from which the pressure has been applied to the pressure sensitive conductive elastic member inserted between a pair of electrodes.

Still further, there are cases in which control of grasping force becomes difficult with a micro-pressure sensor device due to the surface condition of the object of grasping.

Further still, in the case of resonance tensor cell sensor devices, a problem exists in that construction of the distributed sensor is difficult due to the necessity of transmitting and receiving ultra sound waves, whereby it is necessary to make the sensor device large in size in order to enable three-dimensional control of the object of grasping, and difficult to make the sensor device small.

It is a main object of the current invention to solve the above-described problems.

That is to say, the sensor element according to the present invention is provided with an electrically conductive elastic member whose electrical property changes when compressed or expanded by an external force, and a plurality of electrode elements, which are capable of receiving power supply, for measuring electric properties from outside; wherein, plurality of electrode elements are grouped into one or more sets, each having a predetermined number of electrode elements, for measuring electric properties, and the electrode elements grouped together in a set are arranged three-dimensionally inside and on the surface of the conductive elastic member.

According to a configuration such as that described above, when an external force expands or compresses the sensor element, an electrical property of the conductive elastic member changes corresponding to the external force, causing a change in the electrical property between the predetermined number of electrode elements grouped into a set arranged three-dimensionally inside and on the surface of the conductive elastic member. In other words, if the position of the electrode elements that have been moved upon reception of the external force can be obtained based on the changes in the electrical property between the electrode elements, the external force that has been applied to the sensor element can be detected three-dimensionally. Further, if a plurality of sets of electrode elements of the above-described type is provided within predetermined bounds, the distribution of an external force applied within the predetermined bounds can be appropriately detected.

Note that in order to accurately detect the electrical property, it is desirable that the predetermined number of electrode elements constituting a set are respectively arranged at each vertex of a virtual polyhedron, and that the set of a predetermined of electrode elements comprises mobile electrode elements whose position is capable of being displaced when an external force is received and fixed electrode elements whose position is incapable of being displaced even when an external force is received. In particular, if configured such that the virtual polyhedron is a four-sided pyramid with a mobile electrode element disposed at the vertex formed where the four sides meet and fixed electrode elements disposed at the other vertexes of the four-sided pyramid, the effectiveness becomes remarkable.

Further, an advantageous embodiment of the present invention can be realized if the predetermined number of electrode elements constituting a set is arranged so as to be in the form of an array when viewed from the front while in the state of not receiving an external force. In particular, in order to appropriately detect the external force applied within predetermined bounds, it is preferable that the plurality of electrode elements is arranged so as to be in the form of an array when viewed from the front while in the state of not receiving an external force.

Note that it is possible to appropriately prevent error arising when measurement of the electrical property is made if a support base is provided for supporting the fixed electrode elements in an immovable state.

Further, the embedding of the mobile electrode element in the conductive elastic member can be made easy if the mobile electrode element is disposed so as to be exposed at the surface of the conductive elastic member.

An advantageous embodiment of the conductive elastic member according to the present invention can be realized if the conductive elastic member is formed from a base material capable of recovering to its original form from the expansion or compression thereof by an external force, and a plurality of an conductive members having electrical conductivity is mixed into the base material; wherein, the contact state among the conductive members changes when an external force acts on the position at which the conductive members are located, whereby a different internal resistance value is shown. Here, the plurality of conductive members are comprised of at least two or more types classified into different sizes, and the conductive members are either metallic particles, carbon particles or other particles having electrical conductivity, or metallic fibers, carbon fibers or other fibers having electrical conductivity.

Further, an advantageous embodiment of a sensor device according to the present invention that analyzes an external force applied to the sensor element can be realized if the sensor device is provided with the sensor element, an electrical property measuring means for measuring an electrical property between the electrode elements provided on the sensor element for each set of electrode elements, and an external force analyzing means for analyzing external force information related to the magnitude, directionality or the like of the external force, based on the electrical property measured by the electrical property measuring means between the electrode elements for each set of electrode elements.

Still further, if a form estimating means for estimating the form of the conductive elastic member after the deformation thereof by the external force, based on the external force information analyzed by the external force analyzing means, is provided, it is possible to estimate the form of the conductive elastic member deformed by the external force.

Further still, if a three-dimensional display means is provided for displaying the form of the conductive elastic member estimated by the form estimating means, it is possible to more readily know the form of the conductive elastic member.

Yet further still, if the sensor device according to the present invention is of a configuration comprising an object judging means for discriminating the surface condition or composition of the object, based on the external force information analyzed by the external force analyzing means, and an object judgment data storage means for storing object data representing the surface condition or composition of the object, the object judging means can discriminate the surface condition or composition of the object by referencing the object data stored in the object judgment data storage means, whereby it becomes possible to more readily know the surface condition or composition of the object.

In order to use a sensor element such as that described above for movement control so as to move an object to a desired position, it is desirable that the object movement control device be of a configuration comprising: a contacting means on which the sensor is mounted for making physical contact with the object by way of the sensor element; an electrical property measuring means for measuring an electrical property between the electrodes provided on the sensor element for each set of electrodes; an external force analyzing means for analyzing the external force information relating to the magnitude, directionality or the like of the external force, based on the electrical property between the electrodes of each electrode set measured by the electrical property measuring means; and a first position controlling means for controlling the three-dimensional position of the contacting means for the object. Here, it is desirable that the contacting means has a form imitating that of a human finger.

Further, in order to use a sensor element such as that described above for discriminating objects, it is preferable that the device be of a configuration wherein the sensor element is mounted on the object judging means, and comprises: a contact means for making physical contact with the object through the sensor element; an external force analyzing means for analyzing the external force information relating to the magnitude, directionality or the like of the external force, based on the electrical property between the electrodes of each set of electrodes measured by the electrical property measuring means; an object judging means for discriminating the surface condition or composition of the object, based on the external force information analyzed by the external force analyzing means; an object judgment data storage means for storing object data representing the surface condition or composition of the object; and a second position controlling means for causing the sensor element to be in physical contact with the surface of the object while the object judging means discriminates the surface condition or composition of the object, based on the external force information analyzed by the external force analyzing means, when the contacting means is moved.

According to the present invention described above in detail, the current embodiment of the sensor element comprises a conductive elastic member whose electrical property changes when the conductive elastic member is compressed or expanded by the application of an external force, and a plurality of electrode elements, which are capable of receiving power supply, for measuring an electrical property from outside; wherein, the plurality of electrode elements are grouped into one or more sets, each having a predetermined number of electrode elements, for measuring an electrical property, and the electrode elements constituting a set are arranged three-dimensionally inside and on the surface of the conductive elastic member, whereby upon the application of an external force in a direction expanding or compressing the sensor element, the electrical property of the conductive elastic member changes according to the external force, and a change in the electrical property between the predetermined number of electrode elements grouped into set arranged three-dimensionally inside and on the surface of the conductive elastic member occurs. That is to say, if the position to which the electrode elements have been moved upon receiving application of an external force thereto is obtained based on the change in the electrical property between the electrode elements, the external force applied to the sensor element can be detected three-dimensionally. Further, if a plurality of sets of electrode element is disposed within predetermined bounds, it becomes possible to also appropriately detect the distribution of an external force applied within said predetermined bounds.

Further, if the above-described sensor element is used, it becomes possible to realize an object movement control means capable of appropriately controlling the grasping force applied to objects, or an object judging means facilitating appropriate discrimination of the surface condition or composition of an object.

DETAILED DESCRIPTION OF THE PREFERRED EMBODIMENTS

Hereinafter, the preferred embodiments of the present invention will be described in detail with reference to the drawings.

Figure 1:
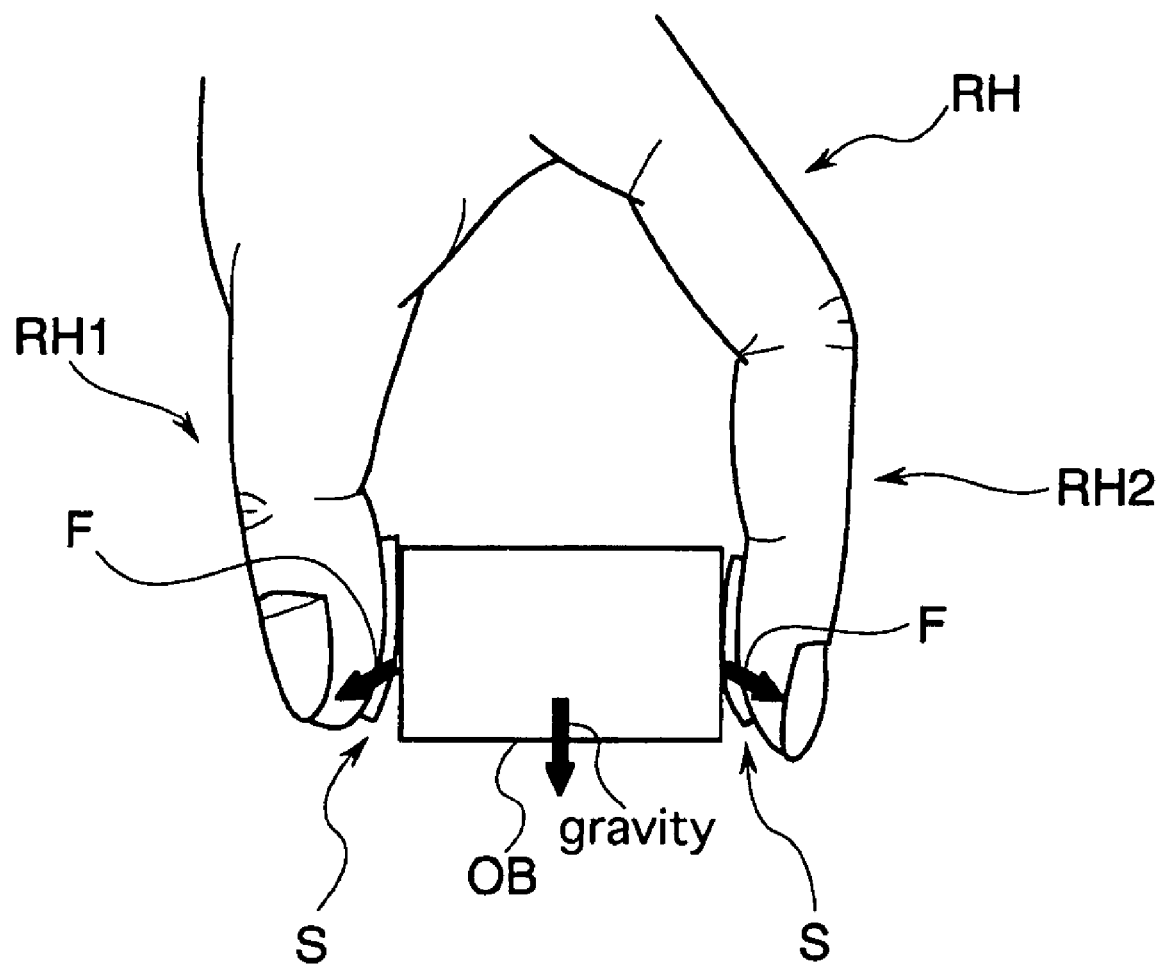
FIG. 1 shows a view of the overall configuration of the sensor device according to an embodiment of the present invention.

As show in FIG. 1, the sensor device P according to the present invention is provided with a robot hand RH serving as a contacting means for making physical contact with an object OB in order to move the object OB, discriminate the surface condition or composition of the object OB, etc, sensor elements S for mounting on the vernal side of the fingertip of each finger of the robot hand RH, and a sensor device main unit P1 (not shown) for measuring and analyzing the changes in an electrical property caused by the application of an external force F to the sensor elements S, and causing the robot hand RH to perform predetermined operations based on the measurement and analysis results.

A detailed description of each part follows.

The robot hand RH according to current embodiment has the form of a human finger, and is a robot hand for controlling movement of the object OB to a desired position, based on a control signal received from the sensor device main unit P1.

The sensor element S is provided with an electrically conductive elastic member D whose electrical property changes when compressed or expanded by an external force, a base plate B serving as a support member for supporting the conductive elastic member D, and a plurality of electrode elements R, which are capable of receiving power supply, arranged three-dimensionally inside and on the surface of the conductive elastic member D for measuring electrical properties from outside.

Figure 2:
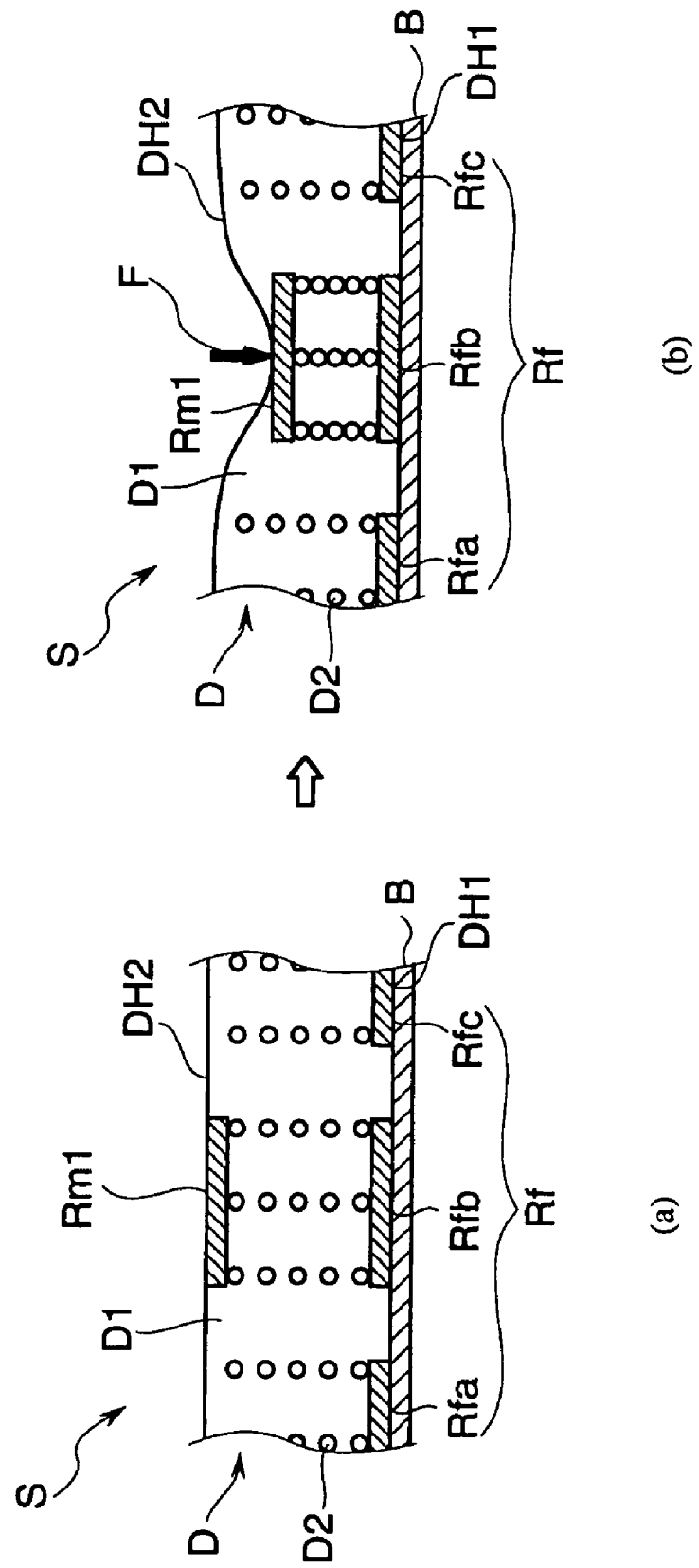
FIG. 2 is a cross-sectional view illustrating the basic construction of the conductive elastic member according to the same embodiment of the present invention as that of FIG. 1.
Figure 3:
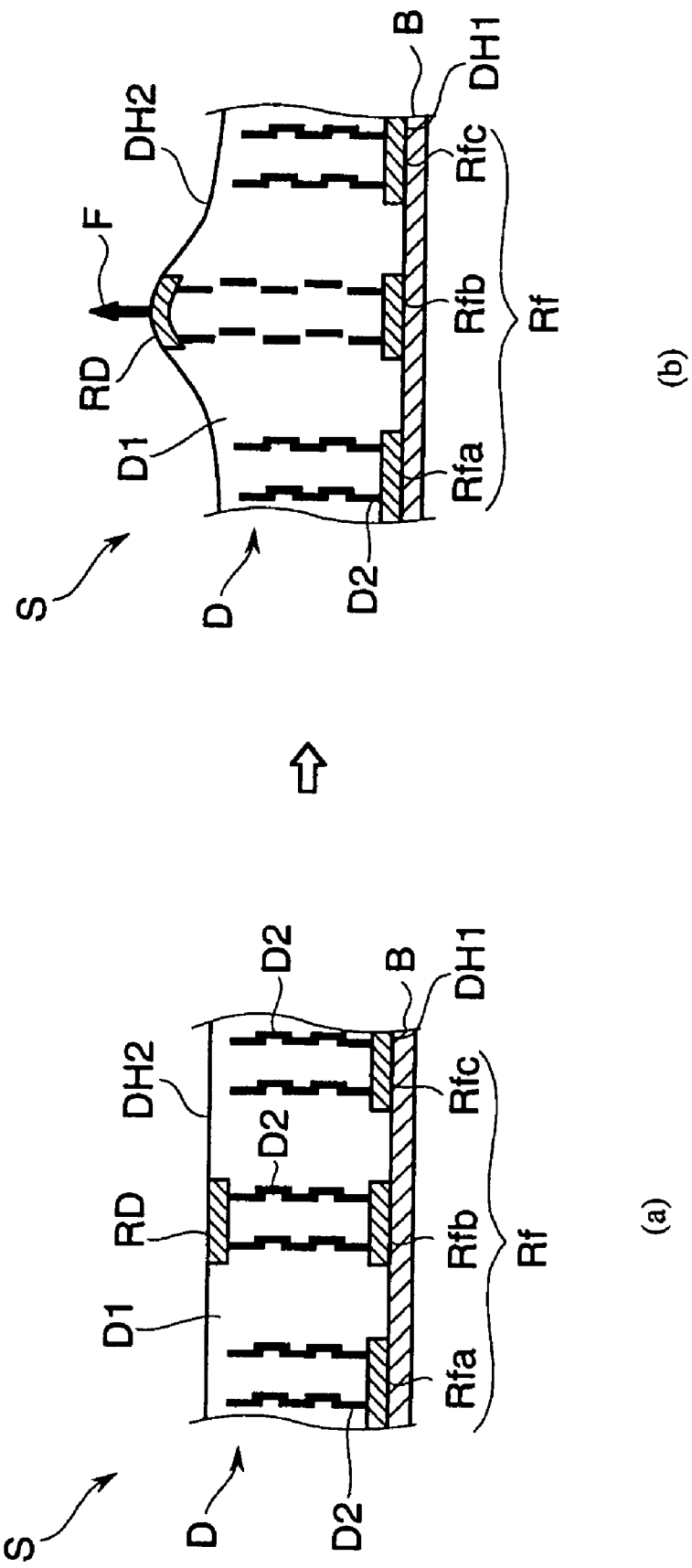
FIG. 3 is a cross-sectional view illustrating the basic construction of the conductive elastic member according to the same embodiment as that of FIG. 1.

More specifically, as shown in FIG. 2$a$, the conductive elastic member D is provided with a base member D1 formed of a silicon capable of recovering to its original form after being compressed or expanded by an external force F, and a plurality of conductive members D2 having electrical conductivity and mixed with the base member D1; wherein, as shown in FIG. 2$b$, when an external force F is applied to the base member D1 a contact relation of the conductive members D2 located at the position receiving the action of the external force F changes, causing a different internal resistance value to be shown. Note that according to the current embodiment, carbon particles having approximately the same size have been used as the conductive members D2; however, the conductive members D2 are not limited to carbon particles. As shown in FIG. 3, metallic particles or metallic fibers, or other fibers having electrical conductivity, such as carbon fibers, can also be used as conductive members D2. Further, an alternative embodiment can be imagined wherein carbon particles classified into at least two or more different sizes are distributed within the base member D1, whereby it becomes possible to favorably detect an external force applied three-dimensionally.

The base plate B is a base plate for supporting the conductive elastic member D, and is formed from a hard rubber that is not deformed even when an external force F is received. Note that the material from which the base plate B is formed is not limited to being hard rubber; so long as the material is not deformed when an external force is received, a composite resin or metallic material, for example, may be used.

Figure 4:
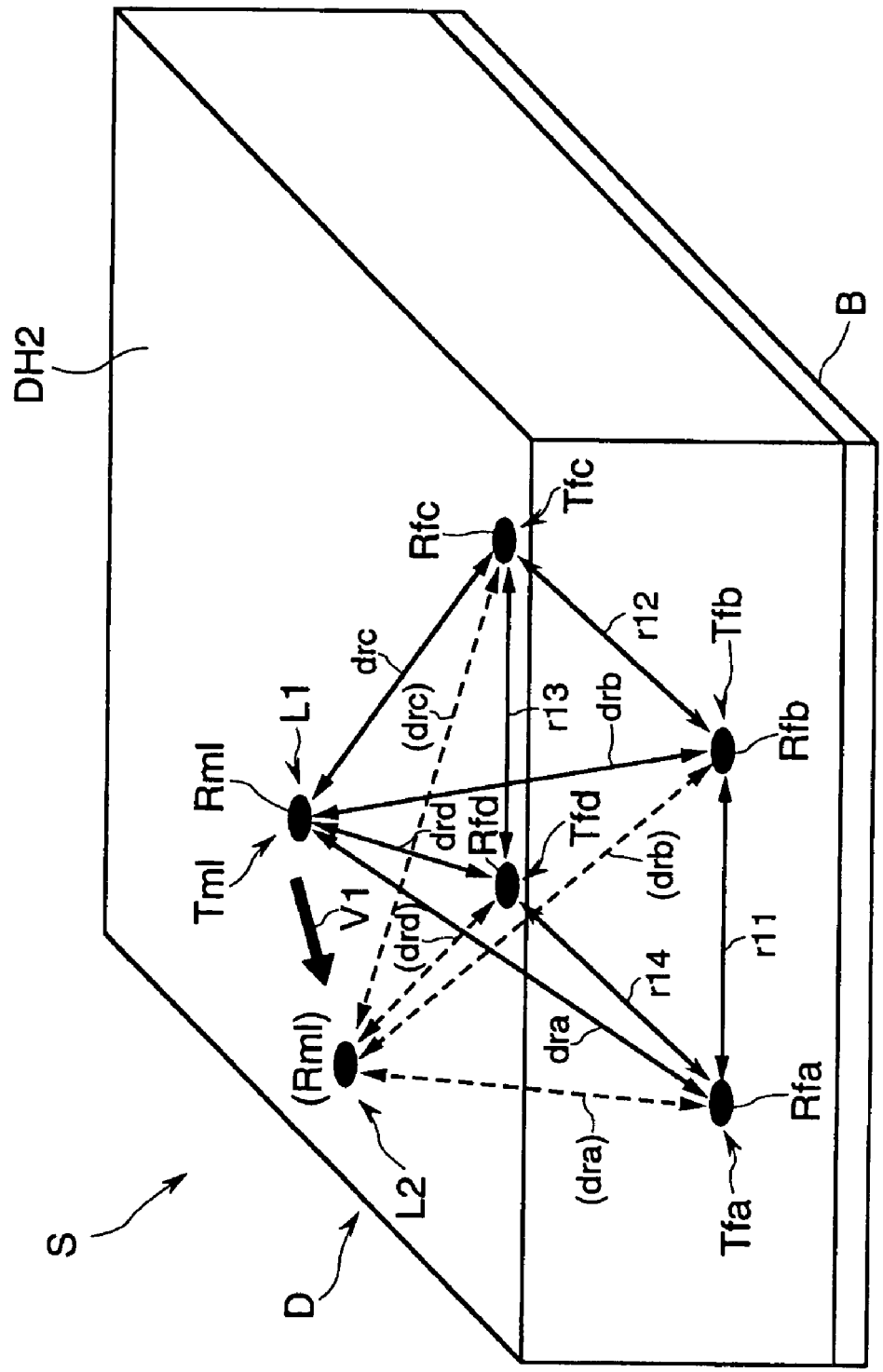
FIG. 4 shows a general view illustrating the disposition of the conductive elastic member according to the same embodiment as that of FIG. 1.

The electrode elements R are thin-sheet discoid chips having electrical conductivity, and as shown in FIG. 4, comprise: fixed electrode elements Rfa, Rfb, Rfc, and Rfd (hereinafter collectively referred to as "fixed electrode elements Rf") arranged on the floor surface DH1 of the conductive elastic member D and supported by the base plate B so as to be positionally immobile even when an external force is received; and mobile electrode elements Rm whose position is capable of mobility in conjunction with the deformation of the conductive elastic member D by an external force, and which are disposed so as to be exposed on the surface of the conductive elastic member D; wherein, the fixed electrode elements Rf and the mobile electrode elements Rm (hereinafter collectively referred to as "electrode elements R") are positioned at the vertexes Tfa, Tfb, Tfc, and Tfd at the floor surface of the virtual four-sided pyramid and at the vertex Tm1 (hereinafter collectively referred to as "vertexes T) where the four sides of the virtual four-sided pyramid meet. Note that according to the current embodiment, during the state wherein an external force F is not being received, the electrode elements Rfa, Rm1, Rfc, and electrode elements Rfb, Rmw, and Rfd appear to be arranged in a linear fashion when viewed from the front.

Figure 5:
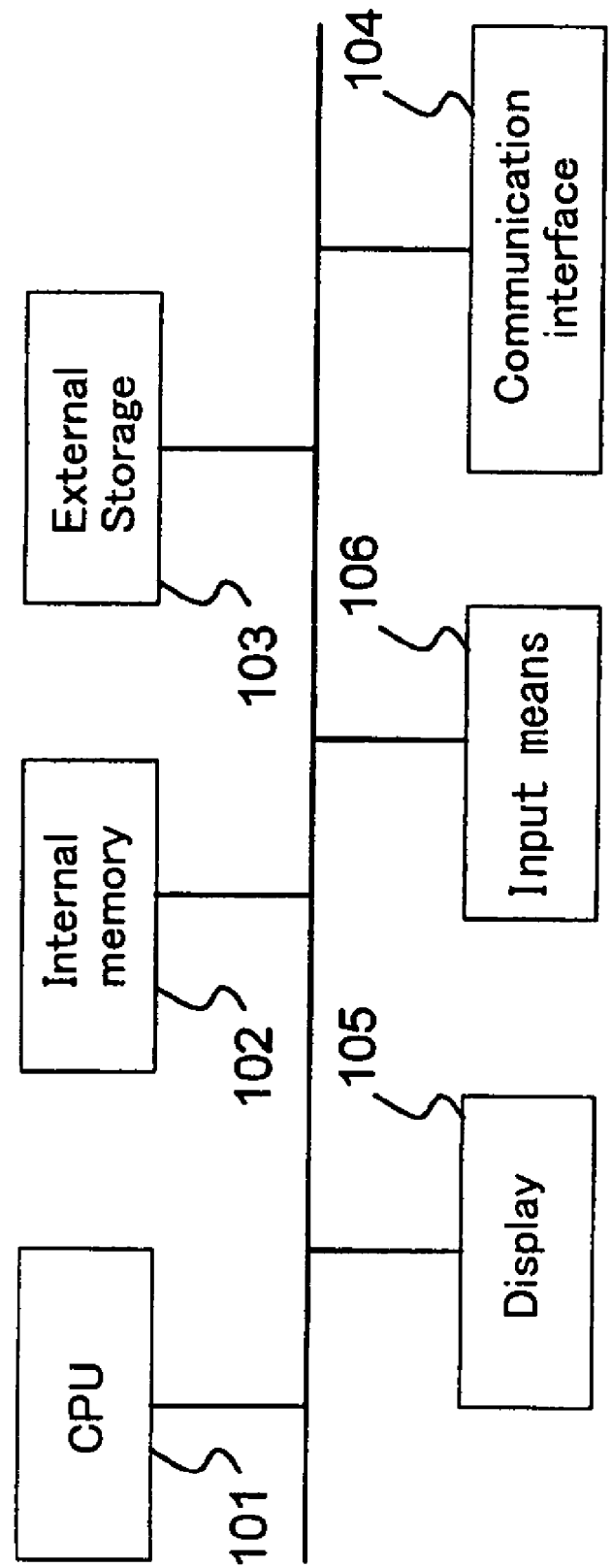
FIG. 5 is a schematic view of the configuration of the internal hardware of the sensor device according to the same embodiment as that of FIG. 1.

The sensor device main unit P1 may be a computer having the general information processing functionality of a personal computer, a workstation or the like, as shown in FIG. 5, comprising: a CPU101; an internal memory 102; an external storage device 103, such as a HDD or the like; a communications interface 104 for applying electrical power to the sensor elements S and controlling the position of the robot hand RH; a display 105; and input means such as a mouse, keyboard or the like, etc.

Figure 6:
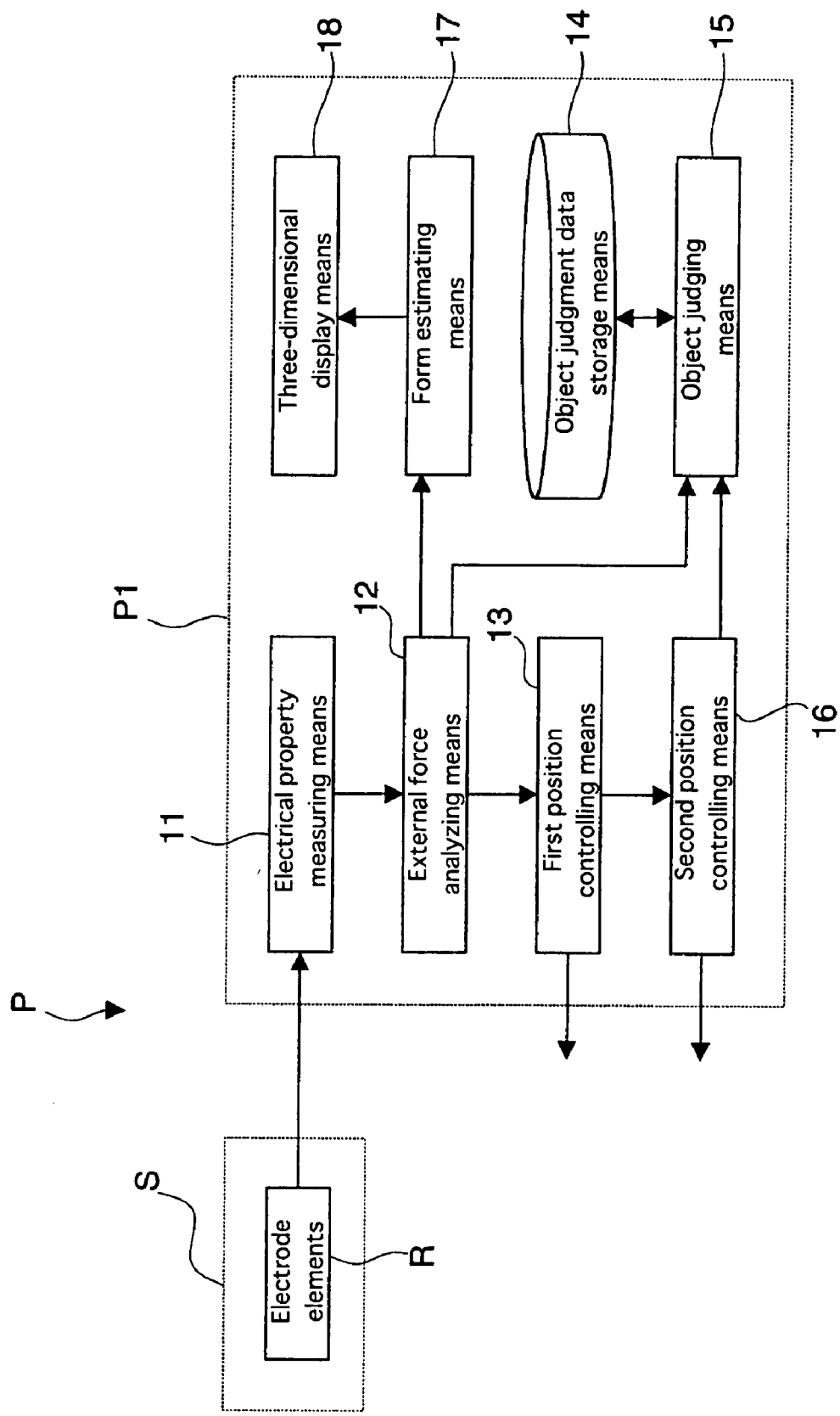
FIG. 6 is a schematic block diagram of the functionality of all hardware of the sensor device according to the same embodiment as that of FIG. 1.

Further, according to the current embodiment, as shown in FIG. 6, the sensor device main unit P1 has installed thereon a predetermined software program for operating the CPU 101, peripheral devices, and so on, whereby the sensor device main unit P1 is provided with the functionality of an electrical property measuring means 11, an external force analyzing means 12, a first position controlling means 13, an object judgment data storage means 14, an object judging means 15, a second position controlling means 16, a form estimating means 17, a three-dimensional display means 18, etc.

More specifically, the electrical property measuring means is a means for measuring the resistance value between the mobile electrode element Rm1 and the fixed electrode elements Rf provided on the sensor elements S. According to the current embodiment, as shown in FIG. 4, the measurements are taken such that the resistance value between the mobile electrode element Rm1 and the fixed electrode element Rfb is drb, the resistance value between the mobile electrode element Rm1 and the fixed electrode element Rfc is drc, and the resistance value between the mobile electrode element Rm1 and the fixed electrode element Rfd is drd (hereinafter collectively referred to as "resistance values dr").

The external force analyzing means 12 is a means for analyzing the external force information such as the magnitude, directionality or the like of the external force F, based on the resistance values rd between the electrode elements R measured by the electrical property measuring means 11.

In even greater detail, by using the following Equation 1 to obtain the distance between each of the electrodes from the resistance values measured when the external force F was received, and using the following Equation 2 to obtain the position x of the mobile electrode element Rm1 from the distances between each of the electrodes obtained by Equation 2, the external force F can be analyzed and the position x of the mobile electrode element Rm1 obtained.

$$ri = f(Ri) \ (i=1, 2, 3, 4) \quad \text{Equation 1}$$

Here, ri is the distance between the mobile electrode element Rm1 and the fixed electrode elements Rf: when i=1, the distance is that between the mobile electrode element Rm1 and the fixed electrode element Rfa; when i=2, the distance is that between the mobile electrode element Rm1 and the fixed electrode element Rfb; when i=3, the distance is that between the mobile electrode element Rm1 and the fixed electrode element Rfc; and when i=4, the distance is that between the mobile electrode element Rm1 and the fixed electrode element Rfd. Further, Ri is the resistance values dr between the mobile electrode element Rm1 and the fixed electrode elements Rf: when i=1, the resistance value is that between the mobile electrode element Rm1 and the fixed electrode element Rfa, resistance value dra; when i=2, the resistance value is that between the mobile electrode element Rm1 and the fixed electrode element Rfb, resistance value drb; when i=3, the resistance value is that between the mobile electrode element Rm1 and the fixed electrode element Rfc, resistance value drc; and when i=4, the resistance value is that between the mobile electrode element Rm1 and the fixed electrode element Rfd, resistance value drd.

Note that f( ) is a function determined by the characteristics of the conductive elastic member D.

$$x = \mathrm{argmin}\_\{x'\}(|xi-x'|-ri)^2 \quad \text{Equation 2}$$

Where (i=1, 2, 3, 4)

Here, x represents the position vector to be obtained for the mobile electrode element Rm1. x' represents the position vector of the mobile electrode element Rm1 after the displacement thereof to the vertex Tm1 upon receiving an external force.

The first position controlling means 13 controls the three-dimensional position of the contacting means with respect to the object OB, based on the external force information analyzed by the external force analyzing means 12.

The object judgment data storage means 14 is a means for storing object data representing the surface condition or composition of the object OB in the internal memory 102 or in a predetermined region of the external storage device 103. More specifically, for the dynamic friction coefficient of various types of fiber objects OB including wool, linen, and silk, for example, the robot hand RH is moved at a speed of 1 mm/sec applying a load of 50 gf to each object OB to first measure the dynamic friction coefficient; then, the measured dynamic friction coefficient for each of the respective objects OB is stored as a reference dynamic friction coefficient. Note that the object data to be stored in the object judgment data storage means 14 is not limited to dynamic friction coefficients; if the data comprises static friction coefficients or other data representing a surface condition or composition of an object OB, it is not restricted in this embodiment. Further, an embodiment wherein object data is obtained online or on a distributed CD-ROM is also conceivable.

The object judging means 15 is a means for discriminating the surface condition or composition of an object OB, based on the external force information analyzed by the external force analyzing means 12 and the reference dynamic friction coefficients stored as object data in the object judgment data storage means 14. More specifically, the measured dynamic friction coefficient measured with the robot hand RH by moving the robot hand RH at a speed of 1 mm/sec and applying a load of 50 gf to the object OB is compared to a reference dynamic friction coefficient to determine whether or not said measured reference values are within a predetermined relationship; if said values are within the predetermined relationship, the surface condition of the object OB is judged to be the surface condition shown by the reference dynamic friction coefficient.

Figure 7:
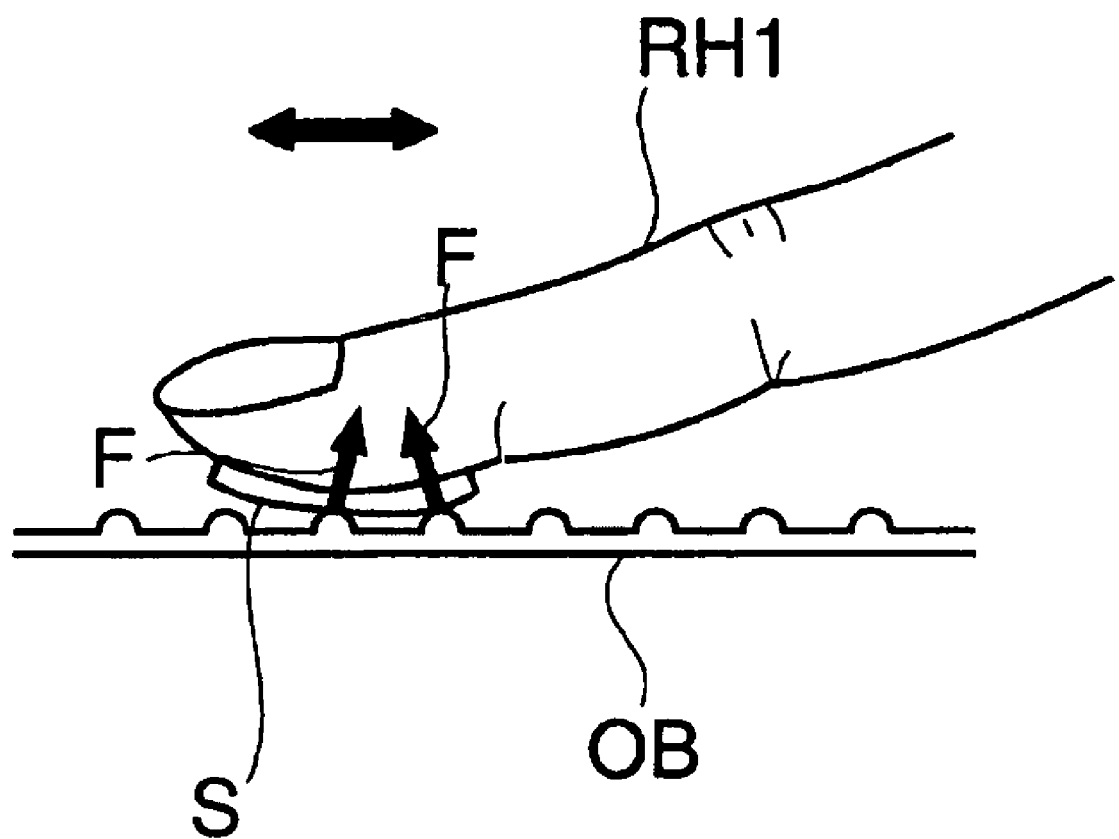
FIG. 7 shows a view of the overall configuration of the sensor device according to an embodiment of the present invention.

The second position controlling means 16, as shown in FIG. 7, is a means for moving the contacting means in a predetermined direction while maintaining contact between the sensor elements S and the surface of the object OB. Note that according to the current embodiment, when discrimination of the surface of the object OB is carried out by the object judging means 15, the speed of the robot hand RH is controlled to 1 mm/sec and the load applied by the robot hand RH to the object OB is controlled to 50 gf.

The form estimating means 17 is a means for estimating the form of the elastic member D after the deformation thereof by an external force, based on the external force information analyzed by the external force analyzing means 12. The three-dimensional display means 18 is a means for displaying three-dimensionally the form of the conductive elastic member D estimated by the form estimating means 17, utilizing the display 105 or the like.

Figure 8:
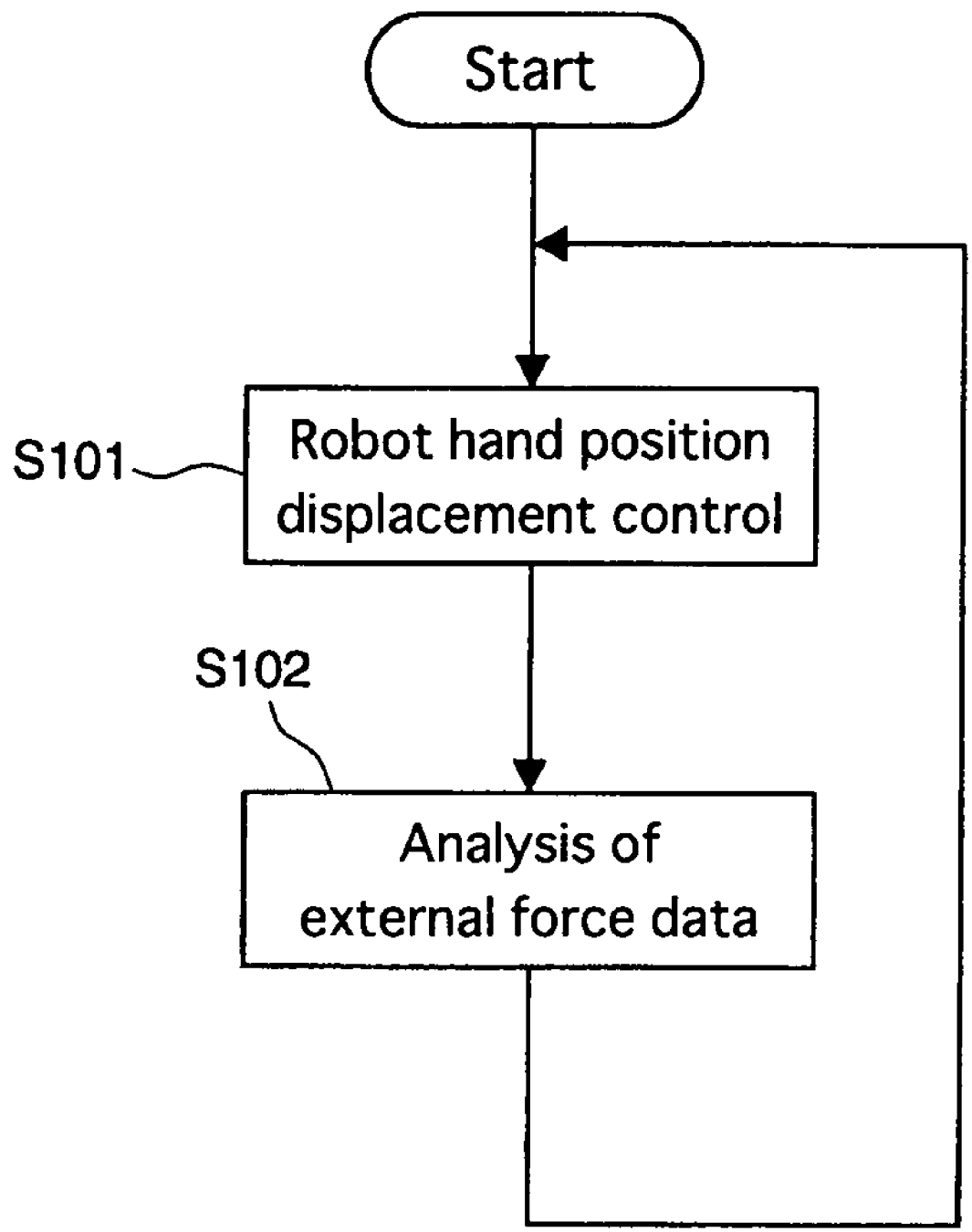
FIG. 8 is a flow chart showing the operation of the sensor device according to the same embodiment of the present invention as that of FIG. 1.
Figure 9:
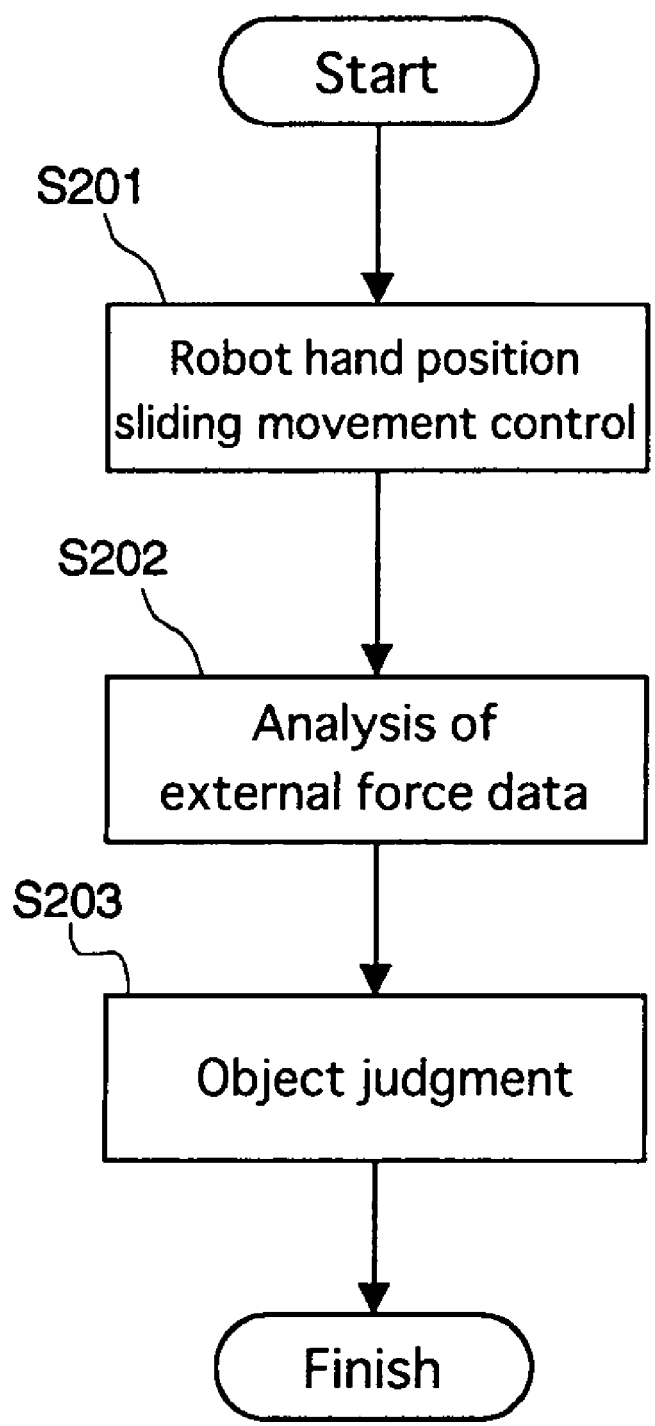
FIG. 9 is a flow chart showing the operation of the sensor device according to the same embodiment as that of FIG. 1.

Next, the operation of the above-described sensor device P will be explained with reference to the flowcharts and the like shown in FIGS. 8 and 9.

The sensor elements S comprised in the sensor device P according to the current embodiment, as shown in FIG. 1, are mounted on the ventral side of the thumb RH1 and index finger RH2 of the robot hand RH and connected to the sensor device main unit P1 by a connector cable (not shown), and will be further explained with regard to the functionality of the sensor device P as a device for controlling the movement of objects.

First, the first position controlling means 13 controls the positions of both of the fingers RH1 and RH2 of the robot hand RH so as to grasp the block serving as the object OB (Step S101) with both fingers of the robot hand RH. Then, when the sensor elements S mounted on the fingertips of the robot hand RH come into contact with the block object OB an external force F is applied thereto, whereby the distance between the electrode elements R and the contact state of the conductive members D2 changes as shown in FIG. 2b and FIG. 4, bringing about a change in the resistance value r occurring between each of the electrode elements R. Further, when the resistance value r between the electrode elements R changes, the electrical property measuring means 11 of the sensor device main unit P1 detects the fact that there have been changes in the resistance values r, and the external force analyzing means 12 analyzes the external force information (Step S102), based on the resistance values r measured by the electrical property measuring means 11. Continuing, the first position controlling means 13 controls the three-dimensional position of the robot hand RH and the fingers RH1 and RH2 with respect to the object OB (Step S101), based on the external force information analyzed by the external force analyzing means 12. More specifically, as shown in FIG. 4, for example, when the external force analyzing means 12 has analyzed that the position of the mobile electrode element Rm1 has been displaced from L1 to L2 due to the reception thereby of an external force, the first position controlling means 13 controls the three-dimensional position of the contacting means so as to move in the opposite direction of the direction vector V1 of the direction from the position L1 toward the position L2. In this manner, the sensor device P can be made to function as an object movement control device capable of appropriately performing grasp control of the object OB.

Further, when said sensor device P is made to function as an object judging means for discriminating the object OB, as shown in FIG. 7, if the sensor S mounted on the tip of the finger RH1 of the robot hand RH is slid across the surface of a fiber serving as the object OB disposed along a horizontal plane, the surface condition or composition of the fiber can be discriminated.

Specifically, first, the second position controlling means 16 of the sensor device main unit P1 slidingly controls the position of the robot hand RH or the finger so as to cause the robot hand RH or the finger to stroke the surface of the fiber (Step S201). This results in the application of an external force F to the sensor element S from the surface of the fiber, as shown in FIG. 2 and FIG. 4, whereby the distance between the electrode elements R and the contact state of the conductive members D2 changes as shown in FIG. 2b and FIG. 4, bringing about a change in the resistance value r occurring between each of the electrode elements R.

In this manner, when the resistance value r between the electrode elements R changes, the electrical property measuring means 11 of the sensor device main unit P1 detects the fact that there have been changes in the resistance values r, and the external force analyzing means 12 analyzes the external force information (Step S202), based on the resistance values r measured by the electrical property measuring means 11. Continuing, the object judging means 15 discriminates the surface condition or composition of the object OB, based on the external force information analyzed by the external force analyzing means 12 and reference dynamic friction coefficients stored as object data in the object judgment data storage means 14 (Step S203). In this way, the sensor device P can be made to function as an object judging means for appropriately discriminating the surface condition or composition of an object OB. Further, if the sensor device main unit P1 is made to function so as to include a Step wherein the form of the deformed conductive elastic member D is estimated, based on the resistance values r measured by the electrical property measuring means 11, and a Step wherein the display means 18 displays the form of the deformed conductive elastic member D estimated by the form estimating means 17 on the display 105, the object OB can be more concretely recognized.

Figure 10:
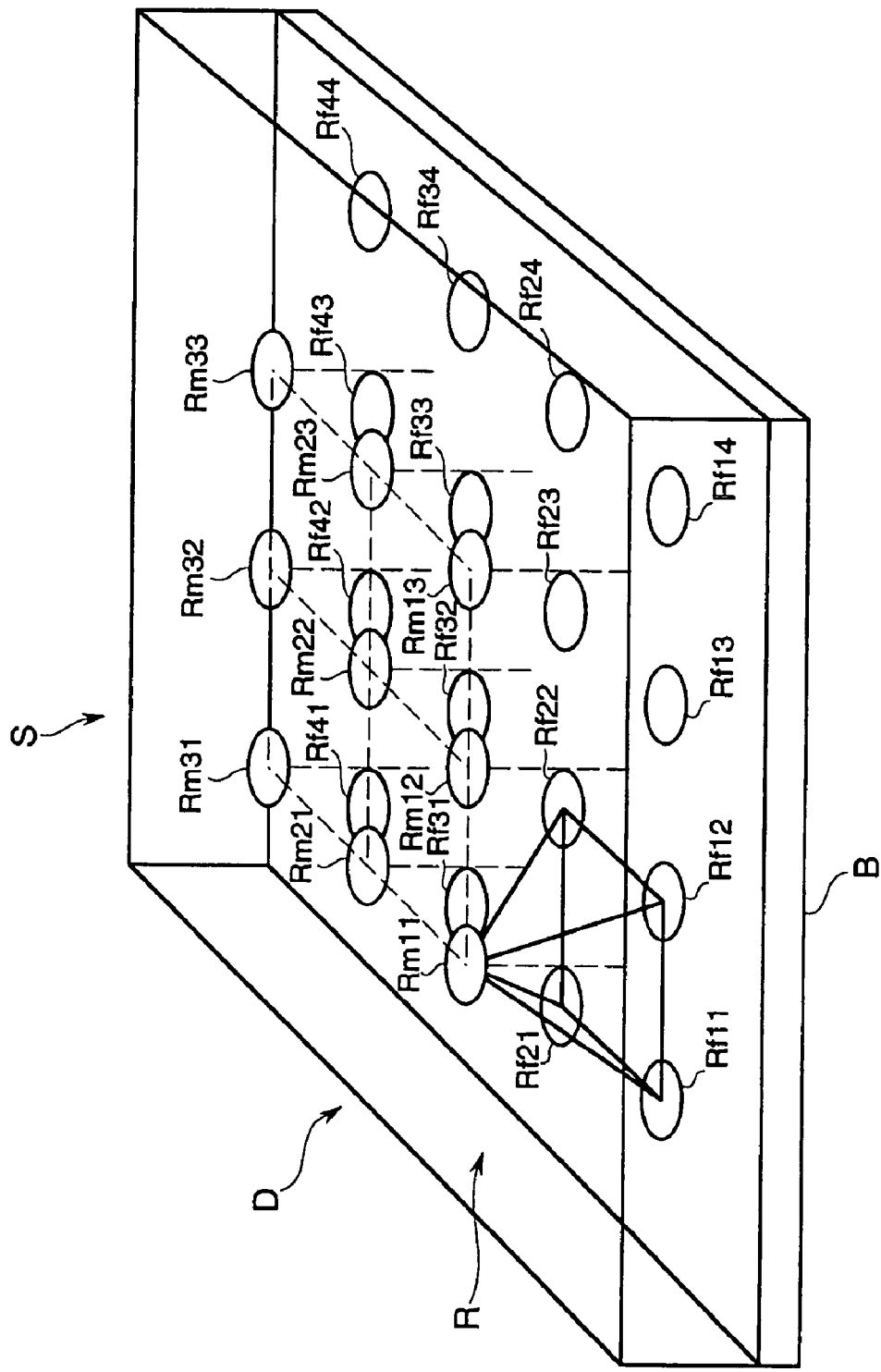
FIG. 10 shows a general view illustrating the disposition of the conductive elastic member according to another embodiment of the present invention.

Note that if the sensor elements S are of a configuration such as that shown in FIG. 10, a force applied across a predetermined range can be analyzed, whereby the sensor elements can be utilized as sensor elements having a higher level of functionality.

More specifically, the sensor element S shown in FIG. 10 comprises a conductive elastic member D and a base plate B, the same as the sensor shown in FIG. 4, nine mobile electrode elements Rm11-Rm33, and sixteen fixed electrode elements Rf11-Rf44.

Further, the mobile electrode elements R11-R33 are arranged so as to be exposed at the surface DH2 of the conductive elastic element D in a grid pattern, and the fixed electrode elements Rf11-Rf44 are supported on the base plate B and arranged so that one mobile electrode element Rm is positioned in the center of four fixed electrode elements Rf when viewed from the front. For example, four fixed electrode elements Rf12, Rf13, Rf23, and Rf24 are arranged centered on the mobile electrode element Rm12 on the lower surface DH1 of the conductive elastic member D2 so as to be supported by the base plate B.)

Further, a plurality of electrode elements R can be grouped into a set comprising fixed electrode elements Rf11, Rf12, Rf22, and Rf21 centered with electrode Rm11, for example, or a set comprising fixed electrode elements Rf12, Rf13, Rf23, and Rf22 with mobile electrode Rm12, so as to be grouped into nine sets. If an external force is analyzed in this method described above at each set grouped together in this manner, it becomes possible to appropriately analyze an external force applied across a predetermined range.

That is to say, if a sensor element S configured such as that shown in FIG. 10 is used, the form of the conductive elastic member D deformed by an external force F can be appropriately estimated, and the surface condition or composition of the object OB appropriately discerned.

As described in detail above, the sensor element S according to the current embodiment is configured such that when an external force F is applied in a direction compressing or expanding the sensor element S, the conductive elastic member D is deformed by the external force F, and a change occurs in the resistance values r between the mobile electrode elements Rm and the fixed electrode elements Rf disposed three-dimensionally inside and on the surface of the deformed conductive elastic member D. Based on the changes in the resistance values r between the mobile electrode elements Rm and the fixed electrode elements Rf, the position of the mobile electrode element Rm displaced b the reception of the external force F can be obtained, whereby the external force F applied to the sensor element S can be detected three-dimensionally.

Further, if a sensor element S such as that described above is used, it becomes possible to realize an object movement control means capable of appropriately controlling the grasping force applied to an object OB, or an object judging means facilitating appropriate discrimination of the surface condition or composition of an object OB.

Note that according to the current embodiment, silicon was used as the base member D1 of the conductive elastic member D; however, a non-electrically conductive other material or the like may also be used.

Further, the sensor element S has been described as being mounted on a robot hand RH; however, the sensor element S may be mounted on the object, and the place of mounting the sensor element S or the number of sensor elements S to be mounted can be determined flexibly according to the specific embodiment.

Still further, the method for distributing a plurality of electrode elements is not limited to that of the current embodiment. For example, as shown in FIG. 4, the distance r11, r12, r13, r14 between each electrode element Rf does not have to be set the same; a different distance may also be set. Yet further still, the grouping of the electrode elements R in the sensor element shown in FIG. 10 is not restricted to that of the current embodiment; for example, a grouping of the mobile electrode element Rm1 with the fixed electrode elements Rf11, Rf14, Rf44, and Rf41 may also be used. In addition, the number of fixed electrode elements Rf grouped with the mobile electrode elements Rm may be set as desired according to the specific embodiment.

As will be understood by those familiar with the art, the present invention is not limited to the above-described embodiments; it can be adapted in numerous variations.

The sensor element according to the present invention can be used to realize an object movement control device capable of appropriately performing object grasp control, or an object judging device capable of appropriately discriminating the surface condition or composition of an object.

The invention claimed is:

1. A sensor element, comprising: a conductive elastic member whose electrical property changes when compressed or expanded by an external force, and a plurality of electrode elements, configured to receive power supply, for measuring an electrical property from outside;
   wherein the plurality of electrode elements are grouped into one or more sets, each having a predetermined number of electrode elements, for measuring an electrical property, and the electrode elements grouped into a set are arranged three-dimensionally inside and on the surface of the conductive elastic member;
   wherein the predetermined number of electrode elements constituting a set are respectively arranged at each vertex of a virtual polyhedron and comprise mobile electrode elements whose position is capable of being displaced when an external force is received, and fixed electrode elements whose position is incapable of being displaced even when an external force is received; wherein the fixed electrode elements are provided with a support member for supporting said fixed electrodes in an immobile state; and
   wherein said conductive elastic member comprises: a base member formed so as to be recoverable to its original form from expansion or compression by an external force and a plurality of an conductive members having electrical conductivity mixed into the base material; wherein, a contact state among the conductive members changes when an external force acts on the position at which the conductive members are located, whereby a different internal resistance value is shown.

2. The sensor element according to claim 1, wherein the polyhedron is a four-sided pyramid, the mobile electrode element is disposed at the apex formed where the four sides of said four-sided pyramid meet, and the fixed electrode elements are disposed at the other vertexes of said four-sided pyramid.

3. The sensor element according to claim 1, wherein the predetermined number of electrode elements constituting a set is arranged so as to be in the form of an array when viewed from the front while in a state of not receiving the external force.

4. The sensor element according to claim 1, wherein the plurality of electrode elements are arranged so as to be in the form of an array when viewed from the front while in a state of not receiving the external force.

5. The sensor element according to claim 1, wherein the mobile electrode element is disposed so as to be exposed on the surface of the conductive elastic member.

6. The sensor element according to claim 1, wherein the plurality of conductive members comprises at least two or more types classified in different sizes.

7. The sensor element according to claim 1, wherein the conductive members are either metallic particles, carbon particles or other particles having electrical conductivity.

8. The sensor element according to claim 1, wherein the conductive members are either metallic fibers, carbon fibers or other fibers having electrical conductivity.

9. A sensor device utilizing the sensor element according to claim 1, said sensor device being a sensor device for analyzing the external force applied to the sensor element, comprising: the sensor element, an electrical property measuring means for measuring the electrical property between the electrodes provided on the sensor element for each set of electrodes, and an external force analyzing means for analyzing external force information related to the magnitude, directionality or other property of the external force, based on the electrical property between the electrode elements measured by the electrical property measuring means for each set of electrodes.

10. The sensor device according to claim 9, further comprising a form estimating means for estimating the form of the conductive elastic member after the deformation thereof, based on the external force information analyzed by the external force analyzing means.

11. The sensor device according to claim 10, further comprising a three-dimensional display means for displaying three-dimensionally the form of the conductive elastic member estimated by the form estimating means.

12. The sensor device according to claim 9, further comprising an object judging means for discriminating the surface condition or composition of the object, based on the external force information analyzed by the external force analyzing means.

13. The sensor device according to claim 12, further comprising an object judgment data storage means for storing object data representing the surface condition or composition of the object; wherein the object judging means can discriminate the surface condition or composition of the object by referencing the object data stored in the object judgment data storage means.

14. An object movement control device utilizing the sensor element according to claim 1, said object control device being a device for controlling movement of an object to a desired position, comprising: a contacting means mounted thereon the sensor element for making physical contact with the object by way of the sensor element, an electrical property measuring means for measuring an electrical property between the electrodes provided on the sensor element for each set of electrodes, an external force analyzing means for analyzing the external force information relating to the magnitude, directionality or the like of the external force, based on the electrical property between the electrodes of each set of electrodes measured by the electrical property measuring means, and a first position controlling means for controlling the three-dimensional position of the contacting means with respect to the object.

15. The object movement control device according to claim 14, wherein the contacting means has a form imitating that of a human finger.

16. An object judging device utilizing the sensor element according to claim 1, said object judging device being a device for discriminating objects, comprising: a contacting means mounted thereon the sensor element for making physical contact with the object by way of the sensor element, an external force analyzing means for analyzing, based on the electrical property between the electrodes of each set of electrodes measured by the electrical property measuring means, the external force information relating to the magnitude, directionality or other property of the external force, an object judging means for discriminating the surface condition or composition of the object, based on the external force information analyzed by the external force analyzing means, an object judgment data storage means for storing object data representing the surface condition or composition of the object, and a second position controlling means for causing the sensor element to be in physical contact with the surface of the object while the object judging means discriminates, based on the external force information analyzed by the external force analyzing means, the surface condition or composition of the object when the contacting means is moved.

* * * * *